J. S. GOLD.
Domestic Oven.
No. 4. Reissued Aug. 6, 1838.
7860X
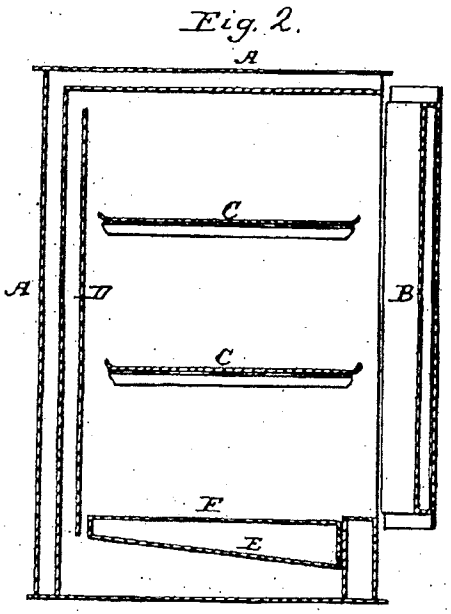
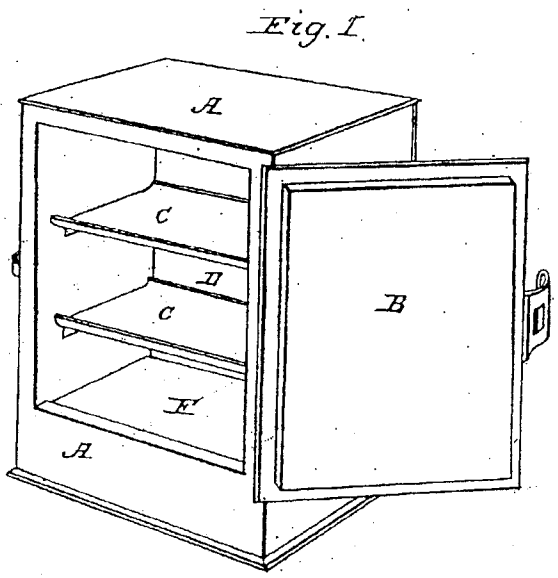

UNITED STATES PATENT OFFICE.

I. SWIFT GOLD, OF NEW YORK, N. Y.

IMPROVEMENT IN AN OVEN CALLED THE "UNION OVEN."

Specification forming part of Letters Patent dated December 16, 1833; Reissue No. 4, dated August 6, 1838.

*To all whom it may concern:*

Be it known that I, I. SWIFT GOLD, of New York, in the county and State of New York, invented a new and useful Improvement in an Oven, and that this invention was in the year of our Lord 1833, of which the following is a specification.

The oven embracing this improvement I named the "Union Oven," and took out Letters Patent therefor as a citizen of Norwich, in the county of New London and State of Connecticut; and whereas under said Letters Patent I laid claim, owing to my inexperience and want of information, to more than was original with me, and in claiming what was original with me specified an effect instead of a mode of producing an effect, therefore I have applied and had said Letters Patent canceled, and I will now give a more accurate description of my improvement called the "Union Oven," which time has proved to be highly valuable.

The characteristics of this oven are that it secures and applies the heat in the most efficient and convenient manner by means of confined air and an internal arrangement causing a certain regular circulation of hot air.

The oven A is most easily constructed of a square form with but one door, B, and without any bottom, as when used it may be placed on the top of a stove or other heated iron plate; but it may be made with more than one door and in any other form. It should be made of tin, thin sheet-iron, or other thin metal plate, and that with a bright surface is to be preferred. By its being thin less heat will be absorbed by it and in that way lost, and by its being of a bright surface the heat is more effectually retained where it is designed to operate.

The oven may be thus constructed: Let two ovens or bodies be made with sides, back, and top, the front of each being open. Let the height and depth from front to back of these be the same at first, but the width of one, say, one inch less than that of the other. Of this which is less in width let the front edges and bottom edges be turned outward half an inch, the top front edge being turned upward the same. The wider oven being now placed over the other, its edges meet the edges that are turned, and must be locked or riveted together or united in any other secure and convenient manner. A double oven is thus formed with a space of half an inch between the respective plates which confine the air. This space may be more, if necessary. Let the door then be made double in a similar manner to fit the front, having a sill or brace across under the bottom to support the oven. The oven thus constructed will confine the heat.

The shelves or grates C in this oven must be supported by hooks or ledges on the sides, and so arranged as to permit the hot air to pass between and around the articles to be baked and pervade the whole oven. The oven may be used in this condition without the internal arrangement above mentioned regulating the circulation of heat or hot air; but this internal arrangement renders the oven more efficient and makes it superior to any other. The circulation may be thus produced: At a distance from the back side of the oven of one-twelfth part of its depth let a sheet of tin or other metal, D, be secured passing from side to side, the upper edge of it reaching to within the same distance of the top of the oven, and the lower edge of it within two or three inches of the bottom. From the lower edge of this plate let another, E, extend three-quarters across toward the opposite side of the oven in the form of an inclined plane with a descent of about one inch in twelve. Another sheet, F, in a horizontal position may be united with this inclined one above it in such manner as to inclose between the two a quantity of confined air, thus forming a shelf for baking, and at the same time securing the articles to be baked from being scorched from the iron plate. That part of the interior thus divided from the other by the lower shelf and plate, which together make the division from near the door to near the top, is a chamber for the generation of heat.

The heat generated heats the air, and then the operation is as follows: This chamber for the generation of heat presents a column of air from the bottom to the top, and the other part, which is the oven, presents another column connected with the former at the top of the division and by the door in front of the bottom shelf. By the generation of heat the air absorbing it is rarefied and rendered lighter, and in its natural ascent is carried by the inclined plate formed by the bottom shelf to the back, and then it rises to the top. At the same time the air in the oven, being less rare- Scanned at National Archives in Kansas City fied, by its preponderance descends to the bottom, where, entering by the door the other chamber, it passes under the bottom shelf, supplying the place of the air which has ascended, and becoming rarefied in turn ascends also, and so on. The heat is constantly more or less absorbed by what is placed in the oven to be cooked, and consequently the air in the oven will continue to preponderate, keeping up the circulation. The shelves must be so arranged that the hot air in its descent can pass around or over whatever is to be operated upon. This internal arrangement by preventing opposing currents of air circulates the heat more rapidly and prevents such accumulation of heat in any part as to burn.

It is plain to be seen that the circulation described is produced by this internal arrangement.

As inventor I do not claim to have first discovered the double case, for that has been long known and can be claimed exclusively by none. As I have lately ascertained, I believe this invention is to be credited to Count Rumford. The double case can only be claimed in certain applications.

I therefore claim and wish to secure by Letters Patent as my invention—

The internal arrangement above described and any other internal arrangement in an oven or stove, though differing somewhat from this in parts and proportions, yet producing the circulation of heat or hot air upon the same principles on which I have founded my invention.

I. SWIFT GOLD.

Witnesses:
ABRAHAM POST,
LAMBT. M. FELTUS.

Scanned at National Archives in Kansas City